US009318965B2

(12) United States Patent
Schroeder gen Berghegger (10) Patent No.: US 9,318,965 B2
(45) Date of Patent: Apr. 19, 2016

(54) METHOD TO CONTROL A MINIMUM PULSEWIDTH IN A SWITCH MODE POWER SUPPLY

(71) Applicant: Flextronics AP, LLC, Broomfield, CO (US)

(72) Inventor: Ralf Schroeder gen Berghegger, Glandorf (DE)

(73) Assignee: Flextronics AP, LLC, Broomfield, CO (US)

( * ) Notice: Subject to any disclaimer, the term of this patent is extended or adjusted under 35 U.S.C. 154(b) by 54 days.

(21) Appl. No.: 13/786,143

(22) Filed: Mar. 5, 2013

(65) Prior Publication Data

US 2014/0098577 A1 Apr. 10, 2014

Related U.S. Application Data

(60) Provisional application No. 61/712,183, filed on Oct. 10, 2012.

(51) Int. Cl.
 *H02M 3/335* (2006.01)
 *H02M 1/00* (2007.01)

(52) U.S. Cl.
 CPC .......... *H02M 3/33546* (2013.01); *H02M 3/335* (2013.01); *H02M 3/33538* (2013.01); *H02M 3/33523* (2013.01); *H02M 3/33553* (2013.01); *H02M 2001/0003* (2013.01); *H02M 2001/0032* (2013.01); *Y02B 70/16* (2013.01)

(58) Field of Classification Search
 CPC ............ H02M 3/335; H02M 3/33507; H02M 3/33515; H02M 3/33523; H02M 3/33538; H02M 3/33546; H02M 3/33553
 USPC ............ 363/21.04, 21.07, 21.08, 21.1, 21.11, 363/21.12, 21.15, 21.16, 21.18
 See application file for complete search history.

(56) References Cited

U.S. PATENT DOCUMENTS

| 4,273,406 A | 6/1981 | Okagami |
| 4,370,703 A | 1/1983 | Risberg |

(Continued)

FOREIGN PATENT DOCUMENTS

| JP | 4217869 A | 8/1992 |
| JP | 10243640 A | 9/1998 |
| JP | 2000083374 A | 3/2000 |
| JP | 20000253648 A | 9/2000 |
| JP | 2004208357 A | 7/2004 |

OTHER PUBLICATIONS

EE Times.com—"Team Claims Midrange Wireless Energy Transfer", by R. Colin Johnson, 4 pages, Nov. 6, 2007.

(Continued)

*Primary Examiner* — Jeffrey Gblende
(74) *Attorney, Agent, or Firm* — Haverstock & Owens LLP (57) ABSTRACT

A power converter circuit includes a transformer and a main switch controller by a primary side controller. A sensing circuit is implemented that senses the voltage at an auxiliary winding of the transformer while the main switch is ON. The auxiliary winding is another winding on the primary side of the transformer, magnetically coupled to the secondary winding and electrically isolated from the primary winding. When the voltage across the auxiliary winding reaches a predefined threshold voltage level, the main switch is switched OFF. The threshold voltage level is set at a value that minimizes an amount of energy transferred per pulse to the secondary side of the circuit while maintaining a minimum amount of energy transfer to enable output voltage sensing at the auxiliary winding.

21 Claims, 4 Drawing Sheets

(56) References Cited

U.S. PATENT DOCUMENTS

| | | | |
|---|---|---|---|
| 4,563,731 A | 1/1986 | Sato et al. |
| 4,645,278 A | 2/1987 | Yevak et al. |
| 4,712,160 A | 12/1987 | Sato et al. |
| 4,788,626 A | 11/1988 | Neidig et al. |
| 4,806,110 A | 2/1989 | Lindeman |
| 4,841,220 A | 6/1989 | Tabisz et al. |
| 4,857,822 A | 8/1989 | Tabisz et al. |
| 4,866,367 A | 9/1989 | Ridley et al. |
| 4,890,217 A | 12/1989 | Conway |
| 4,893,227 A | 1/1990 | Gallios et al. |
| 4,899,256 A | 2/1990 | Sway-Tin |
| 4,901,069 A | 2/1990 | Veneruso |
| 5,065,302 A | 11/1991 | Kanazawa |
| 5,090,919 A | 2/1992 | Tsuji |
| 5,101,322 A | 3/1992 | Ghaem et al. |
| 5,132,890 A | 7/1992 | Blandino |
| 5,235,491 A | 8/1993 | Weiss |
| 5,325,283 A | 6/1994 | Farrington |
| 5,365,403 A | 11/1994 | Vinciarelli et al. |
| 5,373,432 A | 12/1994 | Vollin |
| 5,442,540 A | 8/1995 | Hua |
| 5,673,185 A | 9/1997 | Albach et al. |
| 5,712,772 A | 1/1998 | Telefus et al. |
| 5,768,118 A | 6/1998 | Faulk et al. |
| 5,786,992 A | 7/1998 | Vinciarelli et al. |
| 5,790,395 A | 8/1998 | Hagen |
| 5,811,895 A | 9/1998 | Suzuki et al. |
| 5,838,554 A | 11/1998 | Lanni |
| 5,841,641 A | 11/1998 | Faulk |
| 5,859,771 A | 1/1999 | Kniegl |
| 5,905,369 A | 5/1999 | Ishii et al. |
| 5,923,543 A | 7/1999 | Choi |
| 5,949,672 A | 9/1999 | Bertnet |
| 5,982,153 A | 11/1999 | Nagai et al. |
| 6,009,008 A | 12/1999 | Pelly |
| 6,091,611 A | 7/2000 | Lanni |
| 6,183,302 B1 | 2/2001 | Daikuhara et al. |
| 6,191,957 B1 | 2/2001 | Peterson |
| 6,232,726 B1 * | 5/2001 | Janczak ........................ 315/224 |
| 6,272,015 B1 | 8/2001 | Mangtani |
| 6,275,397 B1 | 8/2001 | McClain |
| 6,307,761 B1 | 10/2001 | Nakagawa |
| 6,323,627 B1 | 11/2001 | Schmiederer et al. |
| 6,385,059 B1 | 5/2002 | Telefus et al. |
| 6,388,897 B1 | 5/2002 | Ying et al. |
| 6,390,854 B2 | 5/2002 | Yamamoto et al. |
| 6,396,716 B1 | 5/2002 | Liu et al. |
| 6,452,816 B2 | 9/2002 | Kuranuki |
| 6,459,175 B1 | 10/2002 | Potega |
| 6,487,098 B2 | 11/2002 | Malik et al. |
| 6,549,409 B1 | 4/2003 | Saxelby et al. |
| 6,578,253 B1 | 6/2003 | Herbert |
| 6,721,192 B1 | 4/2004 | Yang et al. |
| 6,775,162 B2 | 8/2004 | Mihai et al. |
| 6,894,461 B1 | 5/2005 | Hack et al. |
| 6,919,715 B2 | 7/2005 | Muratov et al. |
| 6,989,997 B2 | 1/2006 | Xu |
| 6,990,000 B1 | 1/2006 | Rodriquez et al. |
| 7,035,126 B1 | 4/2006 | Lanni |
| 7,038,406 B2 | 5/2006 | Wilson |
| 7,102,251 B2 | 9/2006 | West |
| 7,139,180 B1 | 11/2006 | Herbert |
| 7,202,640 B2 | 4/2007 | Morita |
| 7,208,833 B2 | 4/2007 | Nobori et al. |
| 7,212,420 B2 | 5/2007 | Liao |
| 7,239,532 B1 * | 7/2007 | Hsu et al. .................... 363/21.12 |
| 7,274,175 B2 | 9/2007 | Manolescu |
| 7,315,460 B2 | 1/2008 | Kyono |
| 7,386,286 B2 | 6/2008 | Petrovic et al. |
| 7,450,388 B2 | 11/2008 | Beihoff et al. |
| 7,564,706 B1 | 7/2009 | Herbert |
| 7,596,007 B2 | 9/2009 | Phadke et al. |
| 7,701,305 B2 | 4/2010 | Lin et al. |
| 7,924,578 B2 | 4/2011 | Jansen et al. |
| 8,059,434 B2 | 11/2011 | Huang et al. |
| 8,102,678 B2 | 1/2012 | Jungreis |
| 8,125,181 B2 | 2/2012 | Gregg et al. |
| 8,126,181 B2 | 2/2012 | Yamamoto et al. |
| 8,134,848 B2 | 3/2012 | Whittam et al. |
| 8,155,368 B2 | 4/2012 | Cheung et al. |
| 8,194,417 B2 | 6/2012 | Chang |
| 8,207,717 B2 | 6/2012 | Uruno et al. |
| 8,243,472 B2 | 8/2012 | Chang et al. |
| 8,344,689 B2 | 1/2013 | Boguslavskij |
| 8,369,111 B2 | 2/2013 | Balakrishnan et al. |
| 8,400,801 B2 | 3/2013 | Shinoda |
| 2002/0008963 A1 | 1/2002 | Dibene et al. |
| 2002/0011823 A1 | 1/2002 | Lee |
| 2002/0036200 A1 | 3/2002 | Ulrich et al. |
| 2003/0035303 A1 | 2/2003 | Balakrishnan et al. |
| 2003/0112645 A1 | 6/2003 | Schlecht |
| 2004/0062061 A1 | 4/2004 | Bourdillon |
| 2004/0183510 A1 | 9/2004 | Sutardja et al. |
| 2004/0252529 A1 | 12/2004 | Huber et al. |
| 2005/0024016 A1 | 2/2005 | Breen et al. |
| 2005/0036338 A1 | 2/2005 | Porter et al. |
| 2005/0117376 A1 | 6/2005 | Wilson |
| 2005/0138437 A1 | 6/2005 | Allen et al. |
| 2005/0194942 A1 | 9/2005 | Hack et al. |
| 2005/0225257 A1 | 10/2005 | Green |
| 2005/0254268 A1 | 11/2005 | Reinhard et al. |
| 2005/0270001 A1 | 12/2005 | Jitaru |
| 2006/0002155 A1 * | 1/2006 | Shteynberg et al. ....... 363/21.12 |
| 2006/0022637 A1 | 2/2006 | Wang et al. |
| 2006/0152947 A1 | 7/2006 | Baker et al. |
| 2006/0213890 A1 | 9/2006 | Kooken et al. |
| 2006/0232220 A1 | 10/2006 | Melis |
| 2007/0040516 A1 | 2/2007 | Chen |
| 2007/0120542 A1 | 5/2007 | LeMay |
| 2007/0121981 A1 | 5/2007 | Koh et al. |
| 2007/0138971 A1 | 6/2007 | Chen |
| 2007/0247091 A1 | 10/2007 | Maiocchi |
| 2007/0263415 A1 | 11/2007 | Jansen et al. |
| 2007/0298653 A1 | 12/2007 | Mahoney et al. |
| 2008/0018265 A1 | 1/2008 | Lee et al. |
| 2008/0043496 A1 | 2/2008 | Yang |
| 2008/0191667 A1 | 8/2008 | Kernahan et al. |
| 2009/0034299 A1 | 2/2009 | Lev |
| 2009/0045889 A1 | 2/2009 | Goergen et al. |
| 2009/0196073 A1 | 8/2009 | Nakahori |
| 2009/0268487 A1 * | 10/2009 | Park ......................... 363/21.12 |
| 2009/0290384 A1 | 11/2009 | Jungreis |
| 2010/0039833 A1 | 2/2010 | Coulson et al. |
| 2010/0073964 A1 * | 3/2010 | Tatsukawa et al. ............. 363/15 |
| 2010/0110732 A1 | 5/2010 | Moyer |
| 2010/0156366 A1 * | 6/2010 | Sakai et al. .................. 323/282 |
| 2010/0232180 A1 * | 9/2010 | Sase et al. ...................... 363/17 |
| 2010/0289466 A1 | 11/2010 | Telefus |
| 2010/0317216 A1 | 12/2010 | Pocrass |
| 2010/0322441 A1 | 12/2010 | Weiss et al. |
| 2011/0096573 A1 | 4/2011 | Zhu et al. |
| 2011/0109248 A1 | 5/2011 | Liu |
| 2011/0132899 A1 | 6/2011 | Shimomugi et al. |
| 2011/0157924 A1 | 6/2011 | Huynh |
| 2011/0255311 A1 | 10/2011 | Hsu et al. |
| 2011/0261590 A1 | 10/2011 | Liu |
| 2012/0112657 A1 | 5/2012 | Van Der Veen et al. |
| 2012/0153866 A1 | 6/2012 | Liu |
| 2013/0148385 A1 | 6/2013 | Zhang |
| 2014/0078790 A1 * | 3/2014 | Lin et al. .................... 363/21.16 |

OTHER PUBLICATIONS

EE Times. com—"Wireless Beacon Could Recharge Consumer Devices", by R. Colin Johnson, 3 pages, Nov. 6, 2007.

Novel Zero-Voltage and Zero-Current Switching (ZVZCS) Full Bridge PWM converter Using Coupled Output Inductor, Sep. 2002 IEEE, pp. 641-648.

"New Architectures for Radio-Frequency dc/dc Power Conversion", Juan Rivas et al., Laboratory for Electromagnetic and Electronic Systems, Jan. 2004, Massachusetts Institute of Technology, Room 10-171 Cambridge, MA 02139, pp. 4074-4084.

(56) References Cited

OTHER PUBLICATIONS

"Randomized Modulation in Power Electronic Converters". Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression", K.K. tse, et al. Member IEEE, IEEE Transactions on Power Electronics, vol. 15., No. 2, Mar. 2000, pp. 399-410.

"Practical on-Line Identification of Power Converter Dynamic Respones", Botao Miao et al., Colorado Power Electronics Center, ECE Department, 2005, pp. 57-62.

"A Modified Cross-Correlation Method for System Identification of Power Converters with Digital Control", Botao Miao et al., Colorado Power Electronics Center, ECE Department, 2004, pp. 3728-3733.

"Design and Implementation of an Adaptive Tuning System Based on Desired Phase Margin for Digitally Controlled DC-DC Converters", Jeffrey Morroni et al., Member IEEE, 2009, pp. 559-564.

* cited by examiner

METHOD TO CONTROL A MINIMUM PULSEWIDTH IN A SWITCH MODE POWER SUPPLY

RELATED APPLICATIONS

This Patent Application claims priority under 35 U.S.C. 119 (e) of the co-pending U.S. provisional application, Ser. No. 61/712,183, filed Oct. 10, 2012, and entitled "Intermediate Valley Switching Mode Converter", by this same inventor. This application incorporates U.S. provisional application, Ser. No. 61/712,183 in its entirety by reference.

FIELD OF THE INVENTION

The present invention is generally directed to the field of power converters. More specifically, the present invention is directed to a new power converter architecture having increased efficiency.

BACKGROUND OF THE INVENTION

A power supply or power converter converts one form and voltage of electrical power to another desired form and voltage. AC-to-DC power supplies convert alternating current voltage, for example 115 or 230 volt alternating current (AC) supplied by a utility company, to a regulated direct current (DC) voltage. DC-to-DC power supplies convert DC voltage at one level, for example 400V, to another DC voltage, for example 12V.

A switched-mode power supply, switching-mode power supply or SMPS, is a power supply that incorporates a switching regulator. An SMPS actively switches a transistor between full saturation and full cutoff at a high rate. The resulting rectangular waveform is then passed through a low-pass filter, typically an inductor and capacitor (LC) circuit, to achieve an approximated output voltage.

A SMPS uses a high frequency switch, a transistor, with varying duty cycle to maintain the output voltage. The output voltage variations caused by the switching are filtered out by the LC filter. SMPSs can be used to step-down a supply voltage as well as provide a step-up function and an inverted output function. An SMPS converts an input voltage level to another level by storing the input energy temporarily and then releasing the energy to the output at a different voltage. The storage may be in either electromagnetic components, such as inductors and/or transformers, or electrostatic components, such as capacitors.

With the introduction of high speed composite semiconductor switches, such as metal oxide semiconductor field effect transistor (MOSFET) switches operated by pulse width modulation (PWM), recent SMPS topologies are now capable of operation at greatly increased switching frequencies, such as, for example, up to 1.0 MHz. However, to be able to provide very low output power with a SMPS, it is necessary to minimize the switching frequency and/or the amount of energy that is transferred to the secondary side of the power supply with each pulse. Very low switching frequency has the disadvantage that voltage sensing via a winding of the transformer is very slow. Conventional voltage sensing is done with a sample and hold element that samples the voltage at a primary side transformer winding while current flows in the secondary winding. This is done when the main switch is in an OFF state. The sensed voltage is used to determine the output voltage. Conventional methods control the on time of the main switch without real-time feedback, which prevents the on time of a present pulse from being influenced by characteristics of the same present pulse. Instead, conventional means provide delayed feedback where characteristics related to a preceding pulse influence the on time of a present pulse.

The power that is transferred to the secondary side is $P=Wp*fs$, where Wp is the energy transferred with each pulse and fs is the switching frequency of the main switch. To minimize the no load power the transferred power P must be as small as possible because it must be consumed by a base load. Otherwise the output voltage rises if no load is connected. The pulse must have a minimum pulse width to ensure that some energy is transferred to the secondary side. To minimize the transferred power P it is necessary to decrease the energy Wp that is transferred with each pulse and the switching frequency fs.

It is very difficult to control the on time precisely enough such that the energy transfer is minimized, but still big enough to have a small amount of energy transferred to the secondary side without direct feedback. If the pulse is too small, all of the energy is lost in parasitic elements. A small variation of the pulse width has quite big influence on the amount of energy that is transferred to the secondary side.

SUMMARY OF THE INVENTION

Embodiments are directed to a power converter circuit and method for minimizing an amount of energy transferred to a secondary side per pulse while maintaining a minimum threshold amount of energy transfer to enable output voltage sensing at the secondary winding of the transformer. The power converter circuit includes a transformer and a main switch coupled to the primary winding. The main switch is turned ON and OFF by a controlled driving circuit. While the main switch is turned ON, a primary current through the primary winding is enabled. To control the amount of energy that is transferred to the secondary side, a sensing circuit is implemented that senses the voltage at an auxiliary winding of the transformer while the main switch is ON. The auxiliary winding is another winding on the primary side of the transformer, magnetically coupled to the secondary winding and electrically isolated from the primary winding. When the voltage across the auxiliary winding reaches a predefined threshold voltage level, the main switch is switched OFF. If the threshold voltage level is selected suitably, then the transferred energy is minimized, but large enough to enable output voltage sensing at the auxiliary winding of the transformer. The threshold voltage level is set at a value that minimizes an amount of energy transferred per pulse to the secondary side of the circuit while maintaining a minimum amount of energy transfer to enable output voltage sensing at the auxiliary winding. In some embodiments, the threshold voltage level is set equal to the output voltage Vout plus the voltage drop across a secondary side diode, the sum multiplied by the turns ratio of the auxiliary winding to the secondary winding.

In an aspect, a method of controlling a switching mode power converter is disclosed. The method includes configuring a switching mode power converter including a transformer with a primary winding coupled to an input supply voltage and a secondary winding, a switch coupled in series to the primary winding, a controller coupled to the switch, and an auxiliary winding electrically coupled to the first controller and magnetically coupled to the secondary winding. The method also includes determining a minimum voltage across the secondary winding to enable energy transfer from a primary side of the transformer to a secondary side. The method also includes turning ON the switch and comparing a voltage across the auxiliary winding to a threshold voltage, wherein the threshold voltage is proportional to the minimum voltage. The method also includes turning OFF the switch once the voltage across the auxiliary winding reaches the threshold voltage, wherein a time period between turning ON the switch and turning OFF the switch is a minimum pulse width of the switch.

In some embodiments, the method also includes transferring energy from the primary side to the secondary side when the switch is OFF. In some embodiments, the method also includes measuring the voltage across the auxiliary winding when the switch is OFF, wherein the measured voltage is proportional to an output voltage of the switching mode power converter. The measured voltage can be used by the controller to determine when to execute the minimum pulse width. In some embodiments, when the switch is OFF, the voltage across the secondary winding increases to the minimum voltage thereby enabling energy transfer, and the voltage across the secondary winding is measured upon the voltage across the secondary winding reaching the minimum voltage. In some embodiments, the switching mode power converter also includes a threshold voltage detection circuit coupled to the auxiliary winding and to the controller, where the threshold voltage detection circuit compares the voltage across the auxiliary winding to the threshold voltage and sends a threshold voltage signal to the controller once the voltage across the auxiliary winding reaches the threshold voltage. In some embodiments, the method also includes powering the controller using energy transferred to the auxiliary winding. In some embodiments, the switch is a transistor. In some embodiments, the threshold voltage equals the minimum voltage multiplied by a turns ratio of the auxiliary winding to the secondary winding. In some embodiments, the minimum voltage is set as a fixed value. In other embodiments, the minimum voltage is a variable value determined by the controller.

In another aspect, another method of controlling a switching mode power converter is disclosed. The method includes configuring a switching mode power converter comprising a transformer having a primary winding coupled to an input supply voltage and a secondary winding, a switch coupled in series to the primary winding, and a controller coupled to the switch. The method also includes determining a minimum voltage across the secondary winding to enable energy transfer from a primary side of the transformer to a secondary side. The method also includes turning ON the switch, and comparing a voltage across the primary winding to a threshold voltage, wherein the threshold voltage is proportional to the minimum voltage. The method also includes turning OFF the switch once the voltage across the primary winding reaches the threshold voltage, wherein a time period between turning ON the switch and turning OFF the switch is a minimum pulse width of the switch.

In yet another aspect, a switching mode power converter is disclosed. The switching mode power converter includes a transformer, a switch, a controller, an auxiliary winding and a threshold voltage detection circuit. The transformer has a primary winding coupled to an input supply voltage and a secondary winding. The switch is coupled in series to the primary winding. The controller is coupled to the switch, wherein the controller is configured to turn the switch ON and OFF. The auxiliary winding is magnetically coupled to the secondary winding. The threshold voltage detection circuit is coupled to the auxiliary winding and to the controller. The threshold voltage detection circuit is configured to compare a voltage across the auxiliary winding to a minimum voltage and to send a signal to the controller once the voltage across the auxiliary winding reaches the minimum voltage. The minimum voltage is a minimum voltage across the secondary winding to enable energy transfer from a primary side of the transformer to a secondary side of the transformer. The controller is configured to switch OFF the switch in response to receiving the signal from the threshold voltage detection circuit.

In some embodiments, the power converter also includes a voltage detection circuit coupled to the auxiliary winding and to the controller, the voltage detection circuit is configured to measure the voltage across the auxiliary winding when the switch is OFF and to send the measured voltage to the controller, wherein the measured voltage is proportional to an output voltage of the switching mode power converter. In some embodiments, the controller is further configured to determine when to turn the switch ON and OFF according to the measured voltage. In some embodiments, the power converter has a resonant circuit that includes the transformer and parasitic capacitances of the transformer and the switch. In some embodiments, the threshold voltage detection circuit is a comparator. In some embodiments, the power converter also includes a power supply circuit coupled to the auxiliary winding and to the controller, wherein the power supply circuit is configured to receive and store energy from the auxiliary winding and to provide energy to the controller. In some embodiments, the power supply circuit includes a pair of transistors and a capacitor. In some embodiments, the minimum voltage is a fixed value. In other embodiments, the minimum voltage is a variable value determined by the controller.

In still yet another aspect, another switching mode power converter is disclosed. The switching mode power converter includes a transformer, switch, a controller, and a threshold voltage detection circuit. The transformer has a primary winding coupled to an input supply voltage and a secondary winding. The switch is coupled in series to the primary winding. The controller is coupled to the switch, wherein the controller is configured to turn the switch ON and OFF. The threshold voltage detection circuit is coupled to the primary winding and to the controller. The threshold voltage detection circuit is configured to compare a voltage across the primary winding to a minimum voltage and to send a signal to the controller once the voltage across the primary winding reaches the minimum voltage or a proportional value thereof. The minimum voltage is a minimum voltage across the secondary winding to enable energy transfer from a primary side of the transformer to a secondary side of the transformer. The controller is configured to switch OFF the switch in response to receiving the signal from the threshold voltage detection circuit.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a power converter. Those of ordinary skill in the art will realize that the following detailed description of the power converter is illustrative only and is not intended to be in any way limiting. Other embodiments of the power converter will readily suggest themselves to such skilled persons having the benefit of this disclosure.

Reference will now be made in detail to implementations of the power converter as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
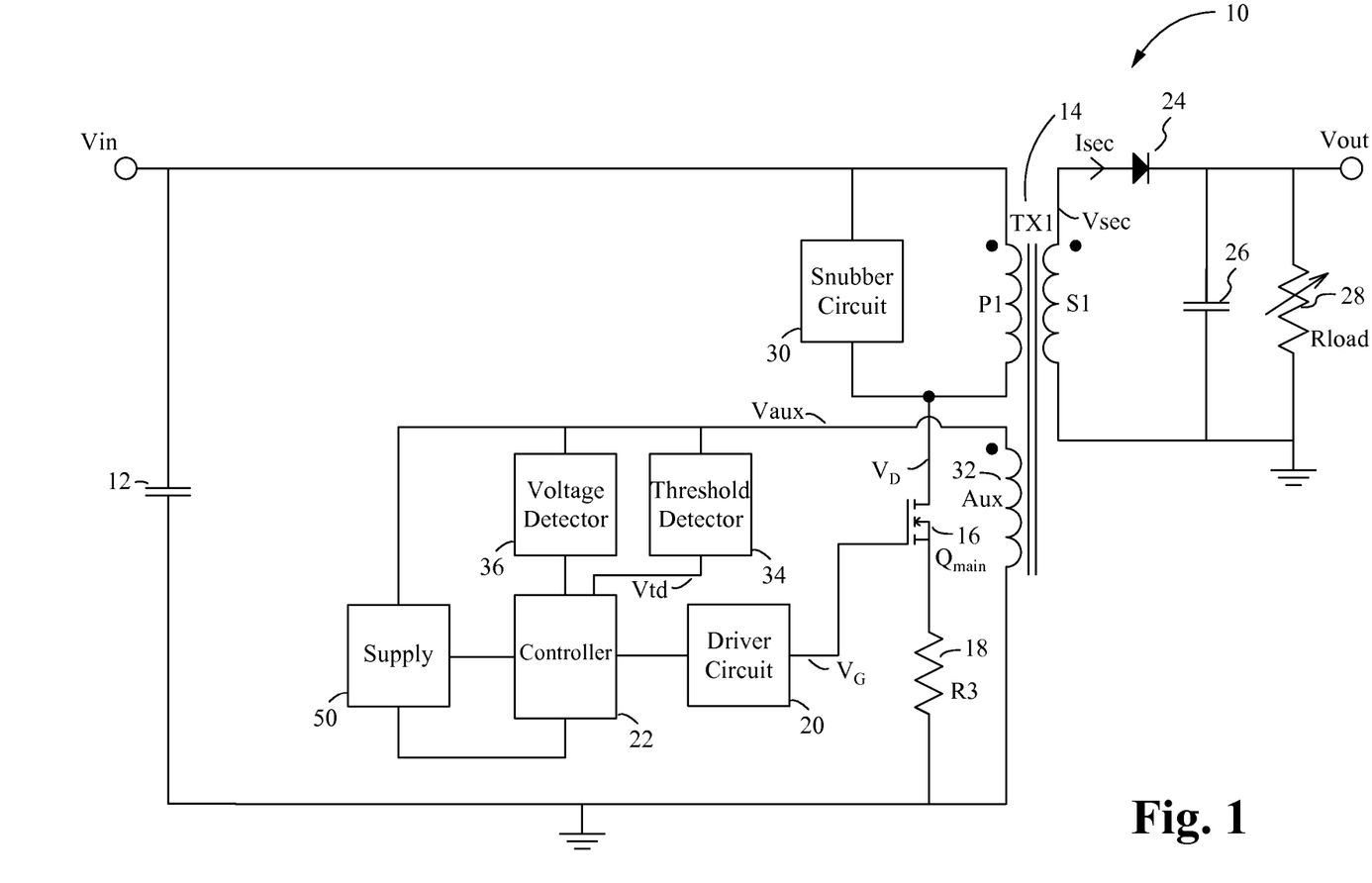
FIG. 1 illustrates a power converter circuit according to an embodiment.

FIG. 1 illustrates a power converter circuit according to an embodiment. The power converter 10 is configured to receive an unregulated DC voltage signal as input voltage Vin and to provide a regulated output voltage Vout. Input voltage to the circuit may be unregulated DC voltage derived from an AC supply after rectification. The input voltage is typically filtered, such as via capacitor 12. In some embodiments, the output voltage level is suitable for many low voltage appliances such as computer laptops, cell phones and other hand held devices. In an exemplary embodiment the output voltage Vout is set at 10V or less. Alternatively, the power converter 10 can provide the output voltage Vout that is greater than 10 VDC.

The power converter 10 is configured as a step down converter. In some embodiments, the power converter is configured to include attributes from a flyback type converter. In general, the power converter can include configurations of switch mode power supplies known to a person of skill in the art. The power converter 10 includes an isolation transformer 14 having a primary winding P1 and a secondary winding S1, a main switch 16, a resistor 18, a driver circuit 20, a controller 22 and a sensing circuit. The primary winding P1 is coupled to the input voltage Vin, the main switch 16 and a snubber circuit 30. The snubber circuit 30 is configured to prevent high peak voltages at the main switch 16 and reduces electromagnetic interference (EMI). The resistor 18 is a shunt resistor and functions to set a peak primary current through the primary winding P1. The main switch 16 is a suitable switching device. In an exemplary embodiment, the switch 16 is a n-type metal-oxide-semiconductor field-effect transistor (MOSFET) device. Alternatively, any other semiconductor switching device known to a person of skill in the art can be substituted for the switch 16. The transistor 16 is controlled by the controller 22 to maintain a desired output voltage Vout. The controller 22 controls the transistor 16 with the driver circuit 20. In some embodiments, the driver circuit 20 is a pulse width modulation (PWM) circuit. The controller 22 regulates the duty cycle of the transistor 16 with the PWM circuit.

An output circuit is coupled to the secondary winding S1. The output circuit includes a diode 24 and a capacitor 26. The secondary winding voltage is rectified and filtered using the diode 24 and the capacitor 26, with the output voltage Vout delivered to a load 28.

In some embodiments, the sensing circuit includes an auxiliary winding 32 that is another winding on the primary side of the transformer 14. The auxiliary winding 32 is magnetically coupled to the secondary winding S1 and electrically isolated from the primary winding P1. The sensing circuit also includes a threshold detector circuit 34, a voltage detector circuit 36, and a power supply circuit 50.

Figure 2:
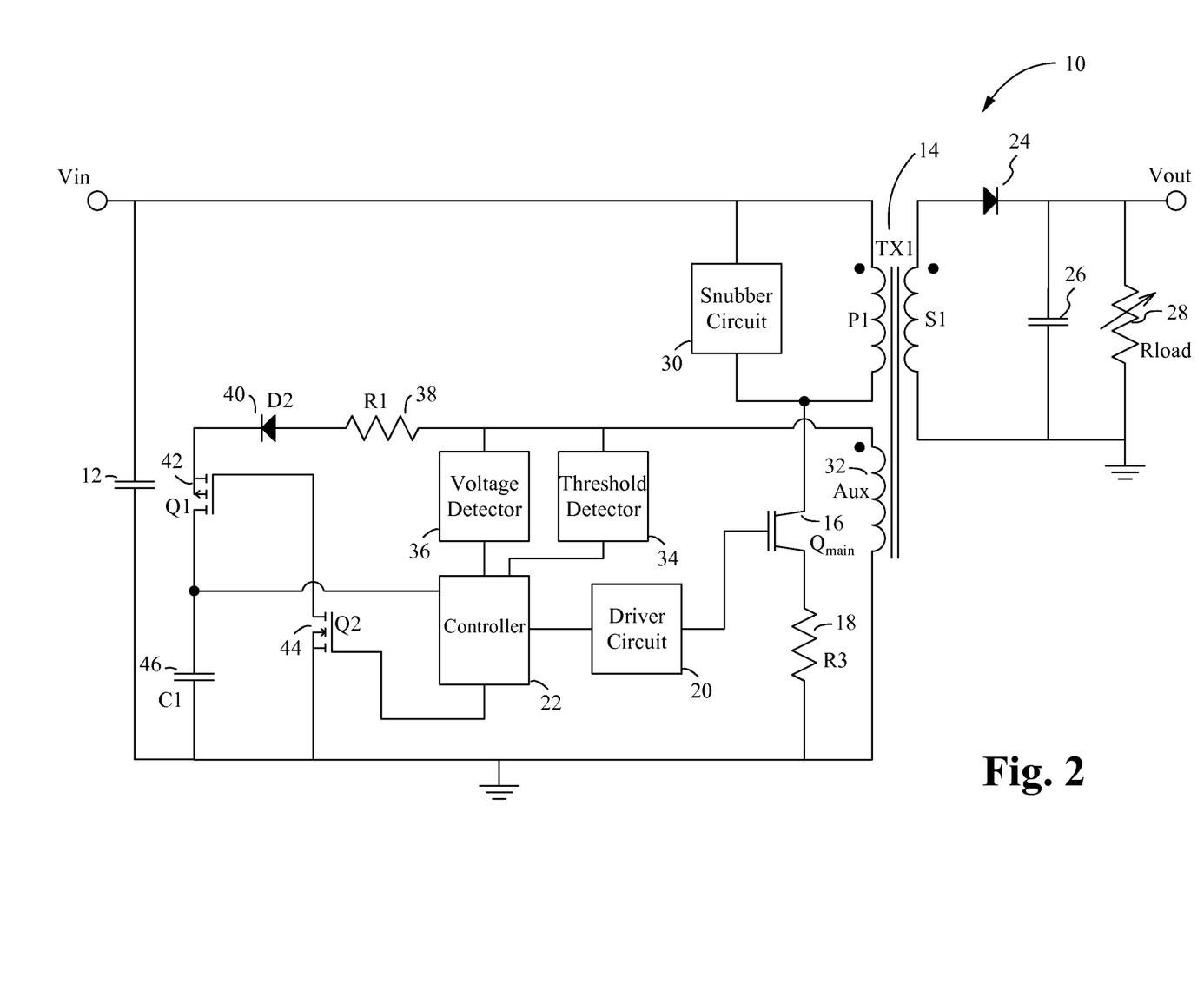
FIG. 2 illustrates the power converter of FIG. 1 with an exemplary configuration of the power supply circuit 50 according to an embodiment.

The power supply circuit 50 is configured to supply power to the controller 22. In some embodiments, the power supply circuit 50 includes a pair of transistors and a capacitor, the transistors under control of the controller 22 for enabling current flow from the auxiliary winding 32 to the capacitor for storing energy used to power the controller 22. FIG. 2 illustrates the power converter 10 of FIG. 1 with an exemplary configuration of the power supply circuit 50 according to an embodiment. In the exemplary configuration of FIG. 2, the power supply circuit 50 includes a resistor 38, a diode 40, a transistor 42, a transistor 44 and a capacitor 46. The resistor 38 and the diode 40 are coupled in series to the auxiliary winding 32 and function to provide supply current from the auxiliary winding 32 to the sensing circuit and the controller 22. The capacitor 46 stores energy while the supply current is provided via the diode 40 and the resistor 38 and powers the controller 22 between pulses. The transistors 42 and 44 enable switching ON and OFF the supply current through the diode 40 and the resistor 38. The transistors 42 and 44 are controlled by the controller 22. The power supply circuit 50 can also function without transistors 42 and 44, but then the minimum pulse must be somewhat bigger because some energy is transferred to the controller 22. With the inclusion of transistors 42 and 44, the controller 22 can control when current flows to the supply, which is the capacitor 46. At minimum pulses, it is preferred to switch OFF the transistors 42 and 44 during sampling of the output voltage because then sampling of the output voltage is more precise and also controlling the minimum pulse is more precise. In some cases, the transistors 42 and 44 must be switched ON during sampling to ensure that the controller 22 gets enough supply power. This should be done with bigger pulses at low frequency.

The voltage detector 36 measures a voltage Vaux across the auxiliary winding 32 and transmits the measured auxiliary winding voltage Vaux to the controller 22. The threshold detector 34 measures the auxiliary winding voltage Vaux and generates a threshold voltage signal when a threshold voltage value is reached. The threshold voltage value is set equal to the output voltage Vout plus the voltage drop across the diode 24, the sum multiplied by the turns ratio of the auxiliary winding to the secondary winding. In some embodiments, this is a first approximation of the threshold voltage value. The threshold voltage value can be subsequently adjusted higher or lower to adjust the amount of energy that is transferred to the secondary side with each pulse. Adjusting the threshold voltage value higher results in higher energy transferred, and adjusting the threshold voltage value lower results in lower energy transferred. Such an adjustment can be made, for example, to compensate for switch OFF delay. The threshold voltage signal is sent to the controller 22 which in response to reaching the threshold voltage level turns OFF the transistor 16. Turning OFF the transistor 16 according to the threshold voltage signal limits a peak voltage level across the auxiliary winding 32. In some embodiments, the threshold detector 34 is a comparator.

In some embodiments, the controller 22 includes a pulse shaper and a SR Flip Flop. The pulse shaper receives the threshold signal from the voltage detector 36 and prevents undefined states at the SR Flip Flop. The SR Flip Flop receives the threshold signal output from the pulse shaper and generates a main switch OFF signal, which corresponds to the auxiliary winding voltage Vaux reaching the threshold voltage level. The main switch OFF signal is provided to the driver circuit 20 and the main switch 16 is turned OFF.

In operation, the transformer 14 and the parasitic capacitances of the transformer 14 and the main switch 16 form a resonant circuit. It is understood that the resonant circuit can include other components including, but not limited to, secondary diode capacitance, snuber circuit, if present, and capacitance and inductance of tracks on the printed circuit board. To transfer energy to the secondary side of the power converter circuit, the voltage amplitude of the first wave of the oscillation at the secondary winding S1 must reach the output voltage Vout plus the voltage drop across the diode 24. If the energy transferred across the transformer 14 is too low, then the energy will be consumed by the parasitics. In this case, the voltage across the secondary winding S1 stays below the critical value of the output voltage Vout plus the voltage drop across the diode 24 and there is no secondary current through the diode 24. With no secondary current, the voltage across the secondary winding S1, and therefore the voltage across the primary winding P1, is independent of the output voltage Vout and the output voltage Vout can not be detected. The value of the output voltage Vout is used by the controller 22 to perform one or more control functions including controlling the minimum pulse width.

Figure 3:
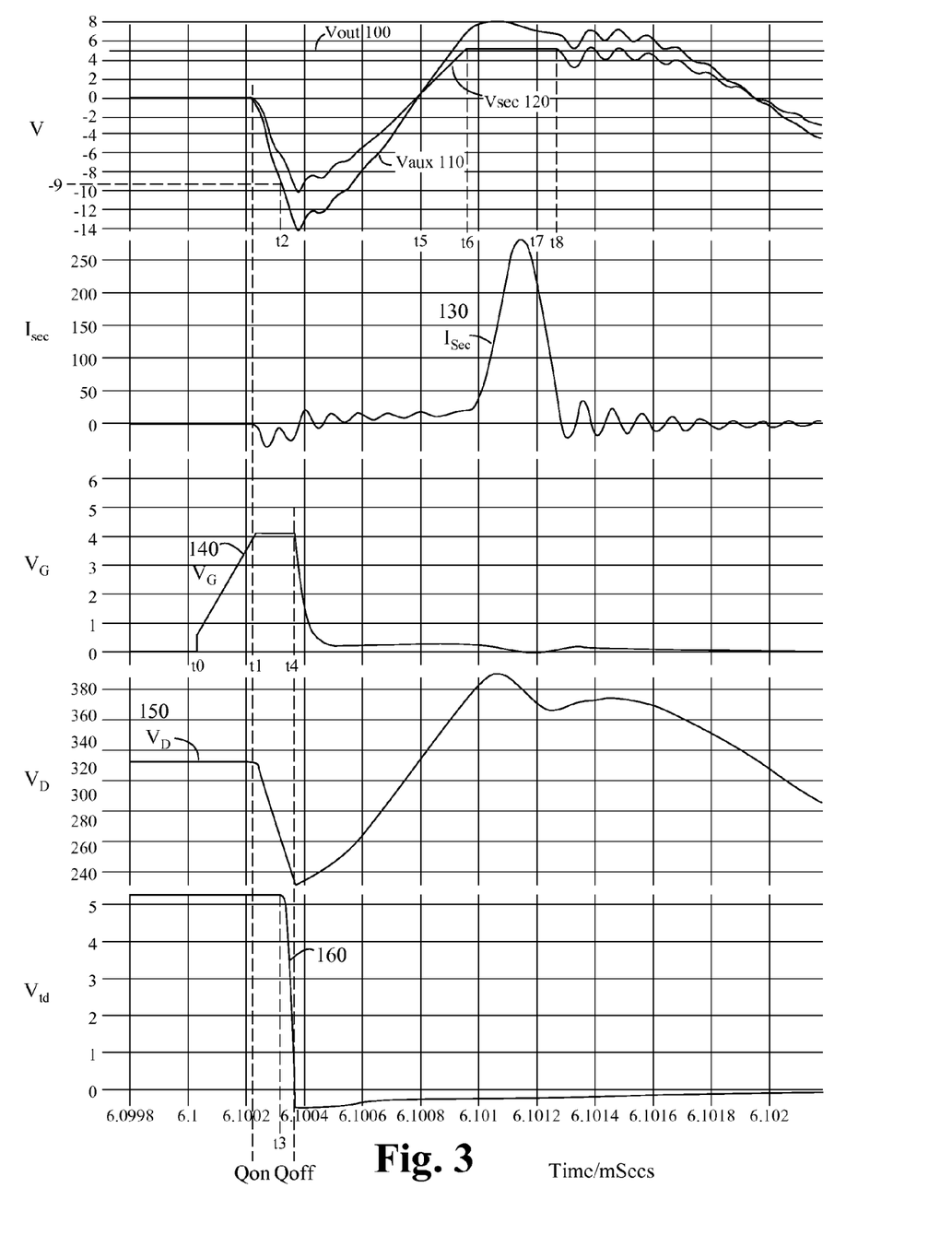
FIG. 3 illustrates various exemplary voltage and current waveforms corresponding to the operation of the power converter circuit of FIG. 1 according to an embodiment.

FIG. 3 illustrates various exemplary voltage and current waveforms corresponding to the operation of the power converter circuit of FIG. 1 according to an embodiment. Waveform 100 shows a voltage Vout which is the output voltage Vout in FIG. 1. Waveform 110 shows a voltage Vaux which is the voltage across the auxiliary winding 32 in FIG. 1. Waveform 120 shows a voltage Vsec which is the voltage across the secondary winding S1 in FIG. 1. Waveform 130 shows a current Isec which is the secondary current in the secondary winding S1 in FIG. 1. Waveform 140 shows a voltage Vg which is the gate voltage applied to the main switch 16 in FIG. 1. Waveform 150 shows a voltage Vd which is the drain voltage of the main switch 16 in FIG. 1. Waveform 160 shows a voltage Vtd which is the voltage output from the threshold detector 34 in FIG. 1.

At time 6.10005 ms (time t0), the controller 22 controls the driving circuit 20 to start switching ON the transistor 16. Accordingly, the gate voltage Vg starts rising. The transistor 16 remains in an OFF state until the gate voltage Vg reaches the turn ON voltage threshold. At time 6.10025 ms (time 1), the turn ON gate voltage Vg is reached and the transistor 16 turns ON. When the transistor 16 turns ON, the current though the transistor 16 starts increasing, resulting in the drain voltage Vd starting to decrease, as shown in waveform 150, and the voltage Vaux across the auxiliary winding 32 starting to decrease, as shown in waveform 110.

At time 6.1003 ms (time t2), the voltage Vaux across the auxiliary winding 32 reaches the set threshold voltage value of the threshold voltage detector 34. The threshold voltage value is set to a value that provides the minimum energy needed for energy transfer across the transformer, for example the output voltage Vout plus the voltage drop across the diode 24, the sum multiplied by the turns ratio. In some embodiments, the threshold voltage value is set as a fixed value, for example as determined by a circuit designer. In other embodiments, the threshold value is a variable value, for example as determined by the controller during operation. In this exemplary application, the threshold voltage is set at −9V. With a small delay, at time 6.10035 ms (time t3), the threshold voltage detector 34 sends a threshold voltage signal to the controller 22, which indicates that the threshold voltage has been reached. In this exemplary application, the threshold voltage signal is indicated by the threshold detection voltage Vtd going low, as shown at time t3 in waveform 160. In response to receiving the threshold voltage signal, the controller 22 instructs the driving circuit 20 to turn OFF transistor 16 at time 6.10038 ms (time t4). With a small delay, the gate voltage Vg drops to nearly 0V, but does not completely reach 0V. The gate voltage Vg does not drop completely to 0V due to parasitic effects. In some embodiments, the gate voltage Vg can drop to 0V, or even a negative voltage, if the driver circuit is configured to reach negative voltage.

The secondary winding voltage Vsec reaches a minimum value when the transistor 16 is turned OFF, a short delay after time t4. In this exemplary application, the minimum value of the secondary winding voltage Vsec is −10V. At this point, the parasitic capacitances of the transformer 14 and the transistor 16 are charged.

Due to the short duration that the transistor 16 is turned ON, from time t1 to t4, there is very low current in the transformer inductance. From the time 6.1004 ms (time t4) when the transistor 16 is OFF to time 6.1008 ms (time t5), the secondary winding voltage Vsec rises from −10V to 0V. In other words, the absolute voltage at the secondary winding S1 drops from 10V to 0V. The energy is transferred from the parasitic capacitances to the transformer inductance. The transformer inductance and the parasitic capacitances form the resonant circuit. When the secondary winding voltage Vsec reaches 0V at time 6.1008 ms, the energy is transferred back from the transformer inductance to the parasitic capacitors.

The secondary winding voltage Vsec continues increasing to a high value equal to the output voltage Vout plus the forward voltage of the diode 24, at time 6.101 ms (time t6). Once the secondary winding voltage Vsec equals the voltage output Vout plus the forward voltage of the diode 24 at time t6, then the remaining energy is transferred to the output. There is a current pulse in the secondary current S1 from time 6.101 ms (time t6) to time 6.1013 ms (time t8), as shown in waveform 130. This current pulse corresponds to the energy transfer to the output. From time 6.101 ms (time t6) to time 6.1013 ms (time t8) there is a dependency between Vout and Vaux. However, from time 6.101 ms (time t6) to time 6.1012 ms (time t7), the voltage Vaux across the auxiliary winding 32 has an overshoot value due to leakage inductance. From time 6.1012 (time t7) to time 6.1013 (time t8), the voltage Vaux has a value that is approximately equal to the secondary winding voltage Vsec*turns ratio (Na/Ns), where Na is the number of turns of the auxiliary winding 32 and Ns is the number of turns of the secondary winding S1.

Between approximately 6.1012 ms (time t7) and time 6.1013 ms (time t8), the voltage detector 36 can determine the output voltage by measuring the voltage Vaux. From time 6.1013 ms (time t8) onwards there is some oscillation that does not transfer power to the output until the transformer settles to 0V/0 A.

Figure 4:
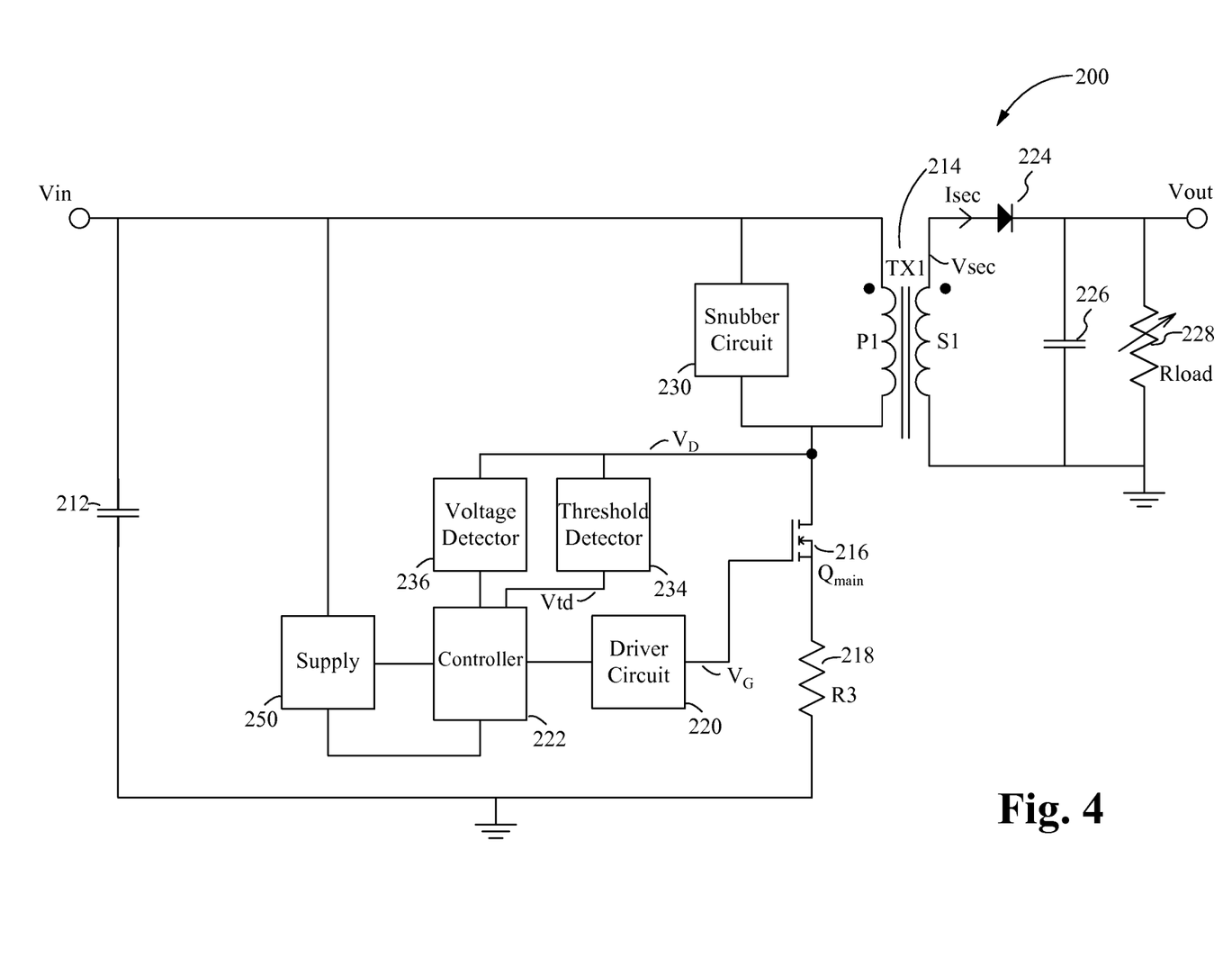
FIG. 4 illustrates a power converter circuit according to another embodiment.

The power converter 10 of FIG. 1 is configured to measure and compare the auxiliary winding voltage Vaux for the purposes of determining when to turn OFF the transistor 16. Alternatively, the power converter can be alternatively configured without the auxiliary winding, where the primary winding is instead measured and compared for the purposes of determining when to turn OFF the main switch. FIG. 4 illustrates a power converter 200 according to another embodiment. The power converter 200 is configured and operates similarly to the power converter 10 of FIG. 1 except the power converter 200 does not include an auxiliary winding. Instead, the voltage detector 236 measures a voltage Vd across the primary winding P1 and transmits the measured voltage Vd to the controller 222. The threshold detector 234 measures the voltage Vd and generates the threshold voltage signal when the threshold voltage value is reached. In the exemplary configuration of FIG. 4, the power supply circuit 250 is coupled to the input voltage Vin. The power converter 200 functions similarly as the power converter 10 in FIG. 1 to turn ON and OFF the transistor 216 according to the value of the voltage Vd.

Using the methodology described above, the amount of energy transferred to the secondary side is minimized by minimizing the pulse width driving the main switch while still providing enough energy transfer to enable determination of the output voltage Vout. The determined output voltage Vout is used by a control algorithm of the controller. The controller uses the determined output voltage Vout to determine when the minimum pulse width is required and when to implement the minimum pulse width by switching ON and OFF the main switch using the gate voltage Vg.

The control methodology enables real-time feedback of the main switch on time, where the on time of the present pulse is influenced by a circuit characteristic related to the same present pulse. In the exemplary application described above, the auxiliary voltage Vaux is measured and compared in real-time, the result of which dictates turning the main switch OFF, thereby influencing the main switch on time in real time.

The present application has been described in terms of specific embodiments incorporating details to facilitate the understanding of the principles of construction and operation of the power converter. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A method of controlling a switching mode power converter, the method comprising:
configuring a switching mode power converter comprising a transformer having a primary winding coupled to an input supply voltage and a secondary winding, a switch coupled in series to the primary winding, a controller coupled to the switch, and a primary side auxiliary winding electrically coupled to the controller and magnetically coupled to the secondary winding;
determining a minimum voltage across the secondary winding to enable energy transfer from a primary side of the transformer to a secondary side;
turning ON the switch;
comparing a voltage across the auxiliary winding to a threshold voltage while the switch is ON, wherein the threshold voltage is proportional to the minimum voltage; and
turning OFF the switch once the voltage across the auxiliary winding reaches the threshold voltage, wherein a time period between turning ON the switch and turning OFF the switch is a minimum pulse width of the switch corresponding to a minimum energy necessary to enable the energy transfer from the primary side to the secondary side.

2. The method of claim 1 further comprising transferring energy from the primary side to the secondary side when the switch is OFF.

3. The method of claim 1 further comprising measuring the voltage across the auxiliary winding when the switch is OFF and there is secondary current,
wherein the measured voltage when the switch is OFF is proportional to an output voltage of the switching mode power converter and the measured voltage is used by the controller to regulate the output voltage.

4. The method of claim 3 wherein the measured voltage is used by the controller to determine when to execute the minimum pulse width.

5. The method of claim 1 wherein when the switch is OFF, the voltage across the secondary winding increases to the minimum voltage thereby enabling energy transfer, and the voltage across the secondary winding is measured upon the voltage across the secondary winding reaching the minimum voltage.

6. The method of claim 1 wherein the switching mode power converter further comprises a threshold voltage detection circuit coupled to the auxiliary winding and to the controller, the threshold voltage detection circuit compares the voltage across the auxiliary winding to the threshold voltage and sends a threshold voltage signal to the controller once the voltage across the auxiliary winding reaches the threshold voltage.

7. The method of claim 1 further comprising powering the controller using energy transferred to the auxiliary winding.

8. The method of claim 1 wherein the switch comprises a transistor.

9. The method of claim 1 wherein the threshold voltage equals the minimum voltage multiplied by a turns ratio of the auxiliary winding to the secondary winding.

10. The method of claim 1 wherein the minimum voltage is set as a fixed value.

11. The method of claim 1 wherein the minimum voltage is a variable value determined by the controller.

12. A switching mode power converter comprising:
a transformer having a primary winding coupled to an input supply voltage and a secondary winding;
a switch coupled in series to the primary winding;
a controller coupled to the switch, wherein the controller is configured to turn the switch ON and OFF;
a primary side auxiliary winding magnetically coupled to the secondary winding; and
a threshold voltage detection circuit coupled to the auxiliary winding and to the controller, wherein the threshold voltage detection circuit is configured to compare a voltage across the auxiliary winding to a minimum voltage while the switch is ON and to send a signal to the controller once the voltage across the auxiliary winding reaches the minimum voltage, wherein the minimum voltage is a minimum voltage across the secondary winding to enable energy transfer from a primary side of the transformer to a secondary side of the transformer,
wherein the controller is configured to switch OFF the switch in response to receiving the signal from the threshold voltage detection circuit such that a minimum energy is stored in the primary winding necessary to enable energy transfer from the primary side of the transformer to the secondary side.

13. The power converter of claim 12 further comprising a voltage detection circuit coupled to the auxiliary winding and to the controller, the voltage detection circuit is configured to measure the voltage across the auxiliary winding when the switch is OFF and there is secondary current and to send the measured voltage to the controller, wherein the measured voltage while the switch is OFF is proportional to an output voltage of the switching mode power converter and the measured voltage is used by the controller to regulate the output voltage.

14. The power converter of claim 13 wherein the controller is further configured to determine when to turn the switch ON and OFF according to the measured voltage.

15. The power converter of claim 12 comprising a resonant circuit including the transformer and parasitic capacitances of the transformer and the switch.

16. The power converter of claim 12 wherein the threshold voltage detection circuit comprises a comparator.

17. The power converter of claim 12 wherein the switch comprises a transistor.

18. The power converter of claim 12 further comprising a power supply circuit coupled to the auxiliary winding and to the controller, wherein the power supply circuit is configured to receive and store energy from the auxiliary winding and to provide energy to the controller.

19. The power converter of claim 18 wherein the power supply circuit comprises a pair of transistors and a capacitor.

20. The power converter of claim 12 wherein the minimum voltage is a fixed value.

21. The power converter of claim 12 wherein the minimum voltage is a variable value determined by the controller.

\* \* \* \* \*